United States Patent
Cai

(10) Patent No.: US 12,145,452 B2
(45) Date of Patent: *Nov. 19, 2024

(54) METHOD OF OPTIMIZING SYSTEM EFFICIENCY FOR BATTERY POWERED ELECTRIC MOTORS

(71) Applicant: Tula eTechnology, Inc., San Jose, CA (US)

(72) Inventor: Xiaoping Cai, Fremont, CA (US)

(73) Assignee: Tula eTechnology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,079

(22) Filed: May 2, 2023

(65) Prior Publication Data

US 2023/0264576 A1 Aug. 24, 2023

Related U.S. Application Data

(63) Continuation of application No. 17/733,232, filed on Apr. 29, 2022, now Pat. No. 11,673,476, which is a
(Continued)

(51) Int. Cl.
*B60L 15/20* (2006.01)
*B60L 15/04* (2006.01)
(Continued)

(52) U.S. Cl.
CPC .......... *B60L 15/2045* (2013.01); *B60L 58/12* (2019.02); *B60L 58/24* (2019.02); *H02P 6/08* (2013.01);
(Continued)

(58) Field of Classification Search
CPC ...... B60L 15/2045; B60L 58/12; B60L 58/24; B60L 15/04; B60L 15/08; B60L 2240/12;
(Continued)

(56) References Cited

U.S. PATENT DOCUMENTS 3,020,651 A 2/1962 Schierhorst
4,441,043 A 4/1984 DeCesare
(Continued)

FOREIGN PATENT DOCUMENTS

CN 1829070 A 9/2006
CN 102381265 A 3/2012
(Continued)

OTHER PUBLICATIONS

International Preliminary Report on Patentability for PCT/IB2022/056551, issued Feb. 13, 2024, 6 pages.
(Continued)

*Primary Examiner* — Alan D Hutchinson
(74) *Attorney, Agent, or Firm* — Womble Bond Dickinson (US) LLP

(57) ABSTRACT

A method of controlling an electric motor to optimize system efficiency of an electric motor operable in a pulsed mode and a continuous mode is disclosed herein. The method includes receiving a requested torque for the electric motor, calculating a pulsed system efficiency, calculating a continuous system efficiency, and operating the electric motor in the pulsed mode when the pulsed system efficiency is greater than the continuous system efficiency. The pulsed system efficiency is calculated for delivering the requested torque from the electric motor in a plurality of torque pulses greater than the requested torque. The continuous system efficiency is calculated for delivering the requested torque from the electric motor as a continuous torque. The system efficiency may be at least partially based on a battery efficiency and a motor efficiency.

20 Claims, 5 Drawing Sheets

Related U.S. Application Data continuation of application No. 17/401,000, filed on Aug. 12, 2021, now Pat. No. 11,345,241.

(51) Int. Cl.
*B60L 15/08* (2006.01)
*B60L 58/12* (2019.01)
*B60L 58/24* (2019.01)
*H02P 6/08* (2016.01)

(52) U.S. Cl.
CPC .............. *B60L 15/04* (2013.01); *B60L 15/08* (2013.01); *B60L 2240/12* (2013.01); *B60L 2240/421* (2013.01); *B60L 2240/423* (2013.01); *B60L 2240/425* (2013.01)

(58) Field of Classification Search
CPC ......... B60L 2240/421; B60L 2240/423; B60L 2240/425; B60L 2240/54; B60L 2240/545; B60L 2240/547; B60L 50/60; B60L 2240/42; H02P 6/08; H02P 6/34; H02P 27/06; H02P 7/29; H02P 25/024
See application file for complete search history.

(56) References Cited

U.S. PATENT DOCUMENTS

| | | |
|---|---|---|
| 4,989,146 A | 1/1991 | Imajo |
| 5,099,410 A | 3/1992 | Divan |
| 5,151,637 A | 9/1992 | Takada et al. |
| 5,325,028 A | 6/1994 | Davis |
| 5,483,141 A | 1/1996 | Uesugi |
| 5,640,073 A | 6/1997 | Ikeda et al. |
| 5,731,669 A | 3/1998 | Shimizu et al. |
| 6,121,740 A | 9/2000 | Gale et al. |
| 6,291,960 B1 | 9/2001 | Crombez |
| 6,308,123 B1 | 10/2001 | Kegaya et al. |
| 6,370,049 B1 | 4/2002 | Heikkila |
| 6,424,799 B1 | 7/2002 | Gilmore |
| 6,493,204 B1 | 12/2002 | Glidden et al. |
| 6,605,912 B1 | 8/2003 | Bharadwaj et al. |
| 6,829,515 B2 | 12/2004 | Grimm |
| 6,829,556 B2 | 12/2004 | Kumar |
| 6,906,485 B2 | 6/2005 | Hussein |
| 6,940,239 B2 | 9/2005 | Iwanaga et al. |
| 7,190,143 B2 | 3/2007 | Wei et al. |
| 7,259,664 B1 | 8/2007 | Cho et al. |
| 7,327,545 B2 | 2/2008 | Konishi |
| 7,411,801 B2 | 8/2008 | Welchko et al. |
| 7,453,174 B1 | 11/2008 | Kalsi |
| 7,558,655 B2 | 7/2009 | Garg et al. |
| 7,577,511 B1 | 8/2009 | Tripathi et al. |
| 7,616,466 B2 | 11/2009 | Chakrabarti et al. |
| 7,768,170 B2 | 8/2010 | Tatematsu et al. |
| 7,852,029 B2 | 12/2010 | Kato et al. |
| 7,960,888 B2 | 6/2011 | Ai et al. |
| 7,969,341 B2 | 6/2011 | Robbe et al. |
| 8,020,651 B2 | 9/2011 | Zillmer et al. |
| 8,099,224 B2 | 1/2012 | Tripathi et al. |
| 8,768,563 B2 | 7/2014 | Nitzberg et al. |
| 8,773,063 B2 | 7/2014 | Nakata |
| 9,046,559 B2 | 6/2015 | Lindsay et al. |
| 9,050,894 B2 | 6/2015 | Banerjee et al. |
| 9,308,822 B2 | 4/2016 | Matsuda |
| 9,495,814 B2 | 11/2016 | Ramesh |
| 9,512,794 B2 | 12/2016 | Serrano et al. |
| 9,630,614 B1 | 4/2017 | Hill et al. |
| 9,702,420 B2 | 7/2017 | Yoon |
| 9,758,044 B2 | 9/2017 | Gale et al. |
| 9,948,173 B1 | 4/2018 | Abu Qahouq |
| 10,060,368 B2 | 8/2018 | Pirjaberi et al. |
| 10,081,255 B2 | 9/2018 | Yamada et al. |
| 10,256,680 B2 | 4/2019 | Hunstable |
| 10,273,894 B2 | 4/2019 | Tripathi |
| 10,291,168 B2 | 5/2019 | Fukuta |
| 10,291,174 B2 | 5/2019 | Irie et al. |
| 10,320,249 B2 | 6/2019 | Okamoto et al. |
| 10,344,692 B2 | 7/2019 | Nagashima et al. |
| 10,381,968 B2 | 8/2019 | Agirman |
| 10,476,421 B1 | 11/2019 | Khalil et al. |
| 10,550,776 B1 | 2/2020 | Leone et al. |
| 10,742,155 B2 | 8/2020 | Tripathi |
| 10,944,352 B2 | 3/2021 | Mazda et al. |
| 11,088,644 B1 | 8/2021 | Carvell |
| 11,133,767 B2 | 9/2021 | Serrano et al. |
| 11,239,772 B1 | 2/2022 | Bojoi et al. |
| 11,345,241 B1 | 5/2022 | Cai |
| 11,427,177 B2 | 8/2022 | Serrano et al. |
| 11,557,996 B1 | 1/2023 | Arvanitis |
| 11,628,730 B2 | 4/2023 | Srinivasan |
| 11,637,513 B2 | 4/2023 | Phillips et al. |
| 11,673,476 B2 | 6/2023 | Cai |
| 11,695,361 B2 | 7/2023 | Carvell et al. |
| 2001/0039926 A1 | 11/2001 | Kobayashi et al. |
| 2002/0043954 A1 | 4/2002 | Hallidy |
| 2003/0094917 A1 | 5/2003 | Garrigan et al. |
| 2005/0127861 A1 | 6/2005 | McMillan et al. |
| 2005/0151437 A1 | 7/2005 | Ramu |
| 2005/0160771 A1 | 7/2005 | Hosoito et al. |
| 2005/0255964 A1 | 11/2005 | Heap et al. |
| 2007/0216345 A1 | 9/2007 | Kanamori |
| 2007/0287594 A1 | 12/2007 | DeGeorge et al. |
| 2008/0129243 A1 | 6/2008 | Nashiki |
| 2008/0179980 A1 | 7/2008 | Dawsey et al. |
| 2009/0045691 A1 | 2/2009 | Ichiyama |
| 2009/0121669 A1 | 5/2009 | Hanada |
| 2009/0128072 A1 | 5/2009 | Strong et al. |
| 2009/0146615 A1 | 6/2009 | Zillmer et al. |
| 2009/0179608 A1 | 7/2009 | Welchko et al. |
| 2009/0306841 A1 | 12/2009 | Miwa et al. |
| 2010/0010724 A1 | 1/2010 | Tripathi et al. |
| 2010/0201294 A1 | 8/2010 | Yuuki et al. |
| 2010/0296671 A1 | 11/2010 | Khoury et al. |
| 2011/0029179 A1 | 2/2011 | Miyazaki et al. |
| 2011/0089774 A1 | 4/2011 | Kramer |
| 2011/0101812 A1 | 5/2011 | Finkle et al. |
| 2011/0130916 A1 | 6/2011 | Mayer |
| 2011/0208405 A1 | 8/2011 | Tripathi et al. |
| 2012/0056569 A1 | 3/2012 | Takamatsu et al. |
| 2012/0112674 A1 | 5/2012 | Schulz et al. |
| 2012/0169263 A1 | 7/2012 | Gallegos-Lopez et al. |
| 2012/0217921 A1 | 8/2012 | Wu et al. |
| 2013/0002173 A1 | 1/2013 | Baglino et al. |
| 2013/0134912 A1 | 5/2013 | Khalil et al. |
| 2013/0141027 A1 | 6/2013 | Nakata |
| 2013/0226420 A1 | 8/2013 | Pedlar et al. |
| 2013/0241445 A1 | 9/2013 | Tang |
| 2013/0258734 A1 | 10/2013 | Nakano et al. |
| 2014/0018988 A1 | 1/2014 | Kitano et al. |
| 2014/0028225 A1 | 1/2014 | Takamatsu et al. |
| 2014/0130506 A1 | 5/2014 | Gale et al. |
| 2014/0176034 A1 | 6/2014 | Matsumura et al. |
| 2014/0217940 A1 | 8/2014 | Kawamura |
| 2014/0265957 A1 | 9/2014 | Hu et al. |
| 2014/0292382 A1 | 10/2014 | Ogawa et al. |
| 2014/0354199 A1 | 12/2014 | Zeng et al. |
| 2015/0025725 A1 | 1/2015 | Uchida |
| 2015/0240404 A1 | 8/2015 | Kim et al. |
| 2015/0246685 A1 | 9/2015 | Dixon et al. |
| 2015/0261422 A1 | 9/2015 | den Haring et al. |
| 2015/0297824 A1 | 10/2015 | Cabiri et al. |
| 2015/0318803 A1 | 11/2015 | Wu |
| 2016/0114830 A1 | 4/2016 | Dixon et al. |
| 2016/0226409 A1 | 8/2016 | Ogawa |
| 2016/0233812 A1 | 8/2016 | Lee et al. |
| 2016/0269225 A1 | 9/2016 | Kirchmeier et al. |
| 2016/0373047 A1 | 12/2016 | Loken et al. |
| 2017/0087990 A1 | 3/2017 | Neti et al. |
| 2017/0163108 A1 | 6/2017 | Schencke et al. |
| 2017/0331402 A1 | 11/2017 | Smith et al. |
| 2018/0032047 A1 | 2/2018 | Nishizono et al. |
| 2018/0045771 A1 | 2/2018 | Kim et al. |
| 2018/0154786 A1 | 6/2018 | Wang et al. |
| 2018/0276913 A1 | 9/2018 | Garcia et al. |

(56) References Cited

U.S. PATENT DOCUMENTS

| | | |
|---|---|---|
| 2018/0323665 A1 | 11/2018 | Chen et al. |
| 2018/0334038 A1 | 11/2018 | Zhao et al. |
| 2019/0058374 A1 | 2/2019 | Enomoto et al. |
| 2019/0288629 A1 | 9/2019 | Tripathi |
| 2019/0288631 A1 | 9/2019 | Tripathi |
| 2019/0341820 A1 | 11/2019 | Krizan et al. |
| 2020/0212834 A1 | 7/2020 | Mazda et al. |
| 2020/0262398 A1 | 8/2020 | Sato et al. |
| 2020/0328714 A1 | 10/2020 | Tripathi |
| 2020/0343849 A1 | 10/2020 | Coroban-Schramel |
| 2020/0366223 A1 | 11/2020 | Coroban-Schramel |
| 2021/0009918 A1 | 1/2021 | Koshima et al. |
| 2021/0170883 A1 | 6/2021 | Hu et al. |
| 2021/0203263 A1 | 7/2021 | Serrano et al. |
| 2021/0323415 A1 | 10/2021 | Carvell et al. |
| 2021/0351733 A1 | 11/2021 | Carvell |
| 2023/0223885 A1 | 7/2023 | Tripathi |

FOREIGN PATENT DOCUMENTS

| | | |
|---|---|---|
| CN | 104716754 A | 6/2015 |
| CN | 204589885 U | 8/2015 |
| CN | 105196877 A | 12/2015 |
| CN | 205229379 U | 5/2016 |
| CN | 106932208 A | 7/2017 |
| CN | 107067780 A | 8/2017 |
| CN | 207129052 U | 3/2018 |
| CN | 108216026 A | 6/2018 |
| CN | 108445386 A | 8/2018 |
| CN | 110212725 A | 9/2019 |
| DE | 102014206342 A1 | 10/2015 |
| EP | 2605398 A1 | 6/2013 |
| FR | 2989479 B1 | 3/2014 |
| JP | 10-243680 A | 9/1998 |
| JP | 2008-079686 A | 4/2008 |
| JP | 2009-065758 A | 3/2009 |
| JP | 201167043 A | 3/2011 |
| JP | 2014-033449 A | 2/2014 |
| JP | 2017-011970 A | 1/2017 |
| JP | 2017-200382 A | 11/2017 |
| JP | 2018-033250 A | 3/2018 |
| KR | 102010021146 A | 2/2010 |
| KR | 1020170021146 A | 2/2017 |
| KR | 1020170032976 A | 3/2017 |
| WO | 03/36787 A1 | 5/2003 |
| WO | 2011086562 A1 | 7/2011 |
| WO | 2012-010993 A2 | 1/2012 |
| WO | 2022088154 A1 | 5/2022 |

OTHER PUBLICATIONS

Cai et al., "Torque Ripple Reduction for Switched Reluctance Motor with Optimized PWM Control Strategy", Energies,; vol. 11, Oct. 15, 2018, pp. 1-27.
Carvell et al, U.S. Appl. No. 17/204,269, filed Mar. 17, 2021.
Carvell, U.S. Appl. No. 16/866,917, filed May 5, 2020.
Carvell, U.S. Appl. No. 17/188,189, filed Mar. 1, 2021.
Islam, U.S. Appl. No. 17/220,228, filed Apr. 1, 2021.
Luckjiff et al., "Hexagonal$Sigma Delta$Modulators in Power Electronics", IEEE Transactions on Power Electronics,; vol. 20, No. 5, Sep. 2005, pp. 1075-1083.
Mirzaeva et al., "The use of Feedback Quantizer PWM for Shaping Inverter Noise Spectrum", Power Electronics and; Motion Control Conference (EPE/PEMC), 2012 15th International IEEE, Sep. 4, 2012, pp. DS3c. 10-DS3c. 11,; XP032311951, DOI: 10.1109/EPEPEMC.2012.6397346, ISBN: 978-1-4673-1970.6.
Ramsey, "How this father and son's new electric turbine could revolutionize electric cars; The Hunstable Electric; Turbine can produce up to three times the torque of any other motor", Available Online at; <https://www.autoblog.com/2020/03/08/hunstable-electric-turbine/>, Mar. 8, 2020, 9 pages.
Serrano et al, U.S. Appl. No. 16/689,450, filed Nov. 20, 2019.
Spong et al., "Feedback Linearizing Control of Switched Reluctance Motors", IEEE Transactions on Automatic; Control, vol. AC-32, No. 5, May 1987, pp. 371-379.
Srinivasan, U.S. Appl. No. 17/158,230, filed Jan. 26, 2021.
Srinivasan, U.S. Appl. No. 17/188,509, filed Mar. 1, 2021.
Tripathi, U.S. Appl. No. 16/353,159, filed Mar. 14, 2019.
Tripathi, U.S. Appl. No. 16/912,313, filed Jun. 25, 2020.
Tripathi, U.S. Appl. No. 16/353,166, filed Mar. 14, 2019.
International Search Report and Written Opinion for PCT/IB22/56551 issued on Oct. 28, 2022.

PULSE CONTROL A

PULSE CONTROL B

METHOD OF OPTIMIZING SYSTEM EFFICIENCY FOR BATTERY POWERED ELECTRIC MOTORS

CROSS-REFERENCE TO RELATED APPLICATION

This application is a continuation of U.S. patent application Ser. No. 17/733,232, filed Apr. 29, 2022, which is a continuation of U.S. patent application Ser. No. 17/401,000, filed Aug. 12, 2021, now U.S. Pat. No. 11,345,241. The entire contents of which are hereby incorporated by reference.

BACKGROUND

1. Technical Field

The present disclosure relates to methods of optimizing system efficiency for battery powered electric motors, and more specifically, to optimizing system efficiency for pulsed electric motors powered by batteries.

2. Discussion of Related Art

Electric motors are known to be efficient at providing continuous torque to driven equipment. The torque delivery of electric motors is typically continuous without the pulsations associated with an internal combustion engine. Generally, electric motors have an optimal efficiency point in mid-low to mid-high range of torque relative to a maximum torque of the electric motor. For example, the maximum efficiency of an electric motor may be in a range of 30% to 80% of the maximum torque of the electric motor.

When an electric motor provides a continuous torque in a low range of the maximum torque of the electric motor, e.g., below 20% of the maximum torque, the efficiency of the electric motor is typically low. It has been found that reducing a duty cycle of the electric motor by pulsing the electric motor at the optimal efficiency point can provide a target torque in a low range of the electric motor at a higher motor efficiency than providing a continuous torque from the electric motor. The pulsing of the electric motor at the optimal efficiency point includes delivering pulses at a modulation frequency.

While pulsing the electric motor at a modulation frequency may have a higher motor efficiency than continuous torque delivery, the pulsing of the electric motor can reduce battery efficiency of the battery system providing power to the electric motor.

SUMMARY

There is a need to optimize system efficiency for pulsed electric motors such that increasing the motor efficiency does not decrease the overall system efficiency as a result of decreased battery efficiency.

This disclosure relates generally to a systems and methods for optimizing a system efficiency by calculating a pulsed system efficiency for a requested pulsed power request and comparing the pulsed system efficiency to a continuous system efficiency and switching the electric motor to a pulsed mode when the pulsed system efficiency is greater than the continuous system efficiency. The pulsed system efficiency and the continuous system efficiency may be calculated by a product of battery efficiency and motor efficiency for conditions of the pulsed motor mode and the continuous motor mode.

In an embodiment of the present disclosure, a method of controlling an electric motor includes receiving a requested torque for an electric motor, calculating pulsed system efficiency, calculating a continuous system efficiency, and operating the electric motor in the pulsed mode when the pulsed system efficiency is greater than the continuous system efficiency. Calculating the pulsed system efficiency is calculated for delivering the requested torque from the electric motor in a pulsed mode. Calculating the continuous system efficiency is calculated for delivering the requested torque from the electric motor in a continuous mode.

In embodiments, calculating the pulsed system efficiency may include determining the pulsed battery efficiency at least partially based on a dissipation heat loss of the battery. Calculating the pulsed system efficiency may include determining the pulsed battery efficiency at least partially based on a battery temperature, a pulsing current, battery terminal voltage, or battery internal resistance.

In another embodiment of the present disclosure, a non-transitory computer-readable medium having instructions stored thereon that, when executed by a controller, cause the controller to calculate a pulsed system efficiency, calculate a continuous system efficiency, and operate an electric motor in the pulsed mode when the pulsed system efficiency is greater than the continuous system efficiency. The controller calculates the pulsed system efficiency by determining the system efficiency for delivering a requested torque from an electric motor in a pulsed mode. The controller calculates the continuous system efficiency by determining the system efficiency for delivering the requested torque from the electric motor in a continuous mode.

In another embodiment of the present disclosure, a controller for operating an electric motor to rotate a driven component includes a processor and a memory including a program to cause the processor to calculate a pulsed system efficiency for delivering a requested torque form an electric motor in a pulsed mode, calculate a continuous system efficiency for delivering the requested torque from the electric motor in a continuous mode, and operate the electric motor in the pulsed mode when the pulsed system efficiency is greater than the continuous system efficiency.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described herein below with reference to the drawings, which are incorporated in and constitute a part of this specification, wherein.

DETAILED DESCRIPTION

Figure 1:
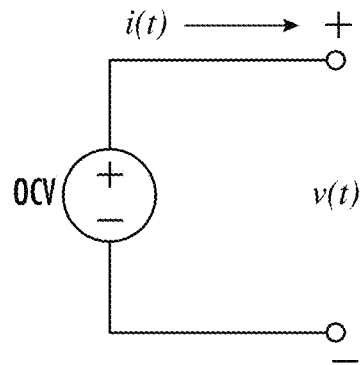
FIG. 1 is a schematic of an Ideal Voltage Source Model.

The present disclosure will now be described more fully with reference to example embodiments with reference to the drawings in which like reference numerals designate identical or corresponding elements in each of the several views. These example embodiments are described so that this disclosure will be thorough and complete, and will fully convey the scope of the disclosure to those with ordinary skill in the technology at the time of the invention. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth below; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

To increase efficiencies of an electric motor in a low torque range of the electric motor, the electric motor may be pulsed to reduce a duty cycle of the electric motor to provide a target torque or demand torque as an average torque delivered over time by pulsing the electric motor at an optimal efficiency point or torque at a modulation frequency. This pulsing of the electric motor may have a Pulse Width Modulation (PWM) waveform of torque delivery. The duty cycle is selected to provide a low target torque to the driven equipment while pulsing the electric motor at the optimal efficiency point. The modulation frequency may be selected to satisfy noise, vibration, and harshness (NVH) requirements and/or to reduce or minimize transition losses between an off-state and an on-state of the electric motor. In certain embodiments, the modulation frequency is selected based on a torsional vibration of the driven equipment For example, an electric motor may be pulsed at an efficient torque of 200 Nm with a 20% duty cycle to provide a target average torque of 40 Nm to driven equipment. Depending on the NVH characteristics of the driven equipment, the 200 Nm pulses may be delivered at a modulation frequency of 30 Hertz (Hz). In an exemplary electric motor, in certain operating condition, pulsing the electric motor to lower a duty cycle to deliver the target torque has been shown to increase motor efficiency by 9% when compared to providing torque demanded through continuous torque delivery.

As discussed above, pulsing the electric motor to deliver target torques below an optimum efficiency point has been shown to increase motor efficiency. However, the pulsing of the electric motor may also affect an efficiency of the battery system providing energy to the electric motor. For example, when an electric motor is pulsed to increase motor efficiency, losses of the battery system may increase and thus, the battery efficiency may decrease as a result of the pulsed energy delivery to the electric motor. This loss of battery efficiency may reduce, offset, or be greater than any motor efficiency gain such that system efficiency of a battery system and electric motor may be decreased from the pulsed energy delivery even if the there is a gain in motor efficiency. As detailed herein below, a method of preventing system efficiency losses as a result of pulsing an electric motor is disclosed. As used herein, the term "system efficiency" is the efficiency of the entire power delivery system including at least the motor efficiency of the electric motor and the battery efficiency of the battery system providing energy to the electric motor.

One method of quantifying an efficiency of the battery system is to determine a heat dissipation of the battery system. The heat dissipation of a battery system may be a function of internal resistance of the battery system and passing current through the battery system. The heat dissipation may also be affected by the terminal voltage of the battery system. For example, as the terminal voltage decreases such that the overpotential increases the current increases to provide the same power output. As a result, as the terminal voltage decreases, the heat dissipation may also increase. As used herein, the term battery system may refer to the battery having a single cell or a plurality of cells. Attributes of the battery system may refer to the battery system as a whole or to individual cells of the battery system.

There are several models for estimating the dissipated heat loss of a battery system. Referring to FIG. 1, an Ideal Voltage Source Model where v(t)=OCV provides a starting point but is clearly inadequate to fully model a dissipated heat loss of a battery system. For example, in the Ideal Voltage Source Model voltage is not a function of current, voltage is not a function of past usage, and voltage is constant. As such, a more accurate model is needed.

Figure 2:
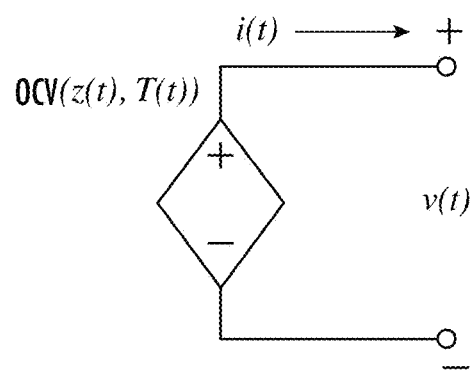
FIG. 2 is a schematic of an Ideal Voltage Source Model including a State of Charge.

Referring now to FIG. 2, a second model for estimating the dissipated heat loss of a battery system may be an Ideal Voltage Source Model including a State of Charge (SOC). In such a model, the state of charge z may be equal to 100 percent when a battery cell is fully charged and may be equal to 0 percent when the cell is fully discharged. The SOC may be modeled as follows:

$$\dot{z}(t) = -i(t)/Q$$

$$z(t) = z(t_0) - \frac{1}{Q}\int_{t_0}^{t} i(\tau)d\tau$$

where Q is the total capacity which is the total amount of charge removed when discharging from fully charged to fully discharged. It is known that battery cells are not perfectly efficient. For example, a battery cell has an energy efficiency that is defined as energy out divided by energy in. This energy efficiency may be around 95 percent for battery cells. The energy lost may be a result of resistive heating during charging and discharging. In addition, during charging, battery cell energy may be lost due to the Coulombic efficiency being less than 1 as a result of unwanted side reactions within the battery cells. However, during discharging of the battery cells, the Coulombic efficiency is generally equal to 1.

Figure 3:
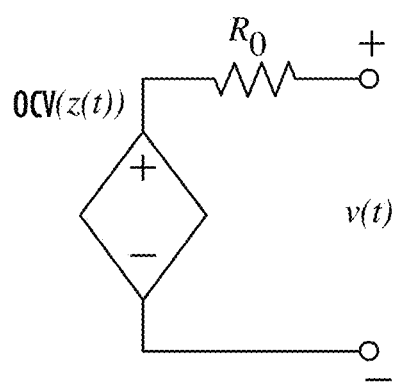
FIG. 3 is a schematic of a Rint Model.

With reference to FIG. 3, a third model for estimating the dissipated heat loss of a battery system may be the "Rint"

Model which is shown including a series resistance. The Rint Model may be modeled as follows:

$$V(t)=OCV(z(t),T(t))-i(t)R0$$

where $V(t)>OCV(z(t), T(t))$ on charge and $V(t)<OCV(z(t), T(t))$ on discharge. The power dissipated by $R_0$ is dissipated by heat which represents dissipated heat loss. While this Rint Model may be sufficient for simple electronic designs, this Rint Model may have inaccuracies when applied to advanced electronics and EV applications. For example, a battery cell may have diffusion processes within the cell such when a cell rests, the voltage does not immediately return to OCV.

While there may be more advanced models that take into account diffusion voltages and hysteresis such as a "Thevenin Model" or an Enhanced Self-Correcting (ESC) Cell Model, the Rint Model may give some insight as to changes in the dissipated heat loss within a battery cell in a continuous power delivery versus a pulsed power delivery. These and other models may be used in implementation of the methods detailed herein.

Figure 4:
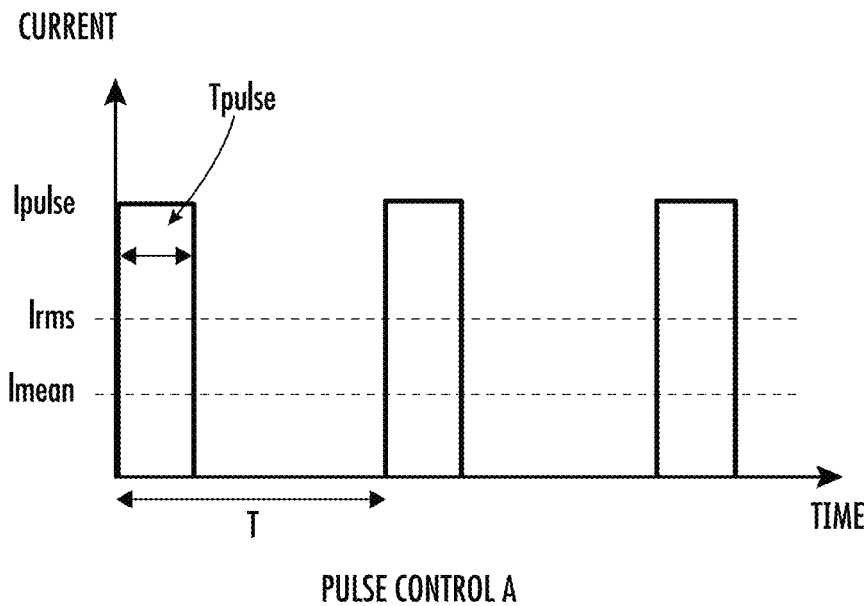
FIG. 4 is an illustration of a first pulse control pattern provided in accordance with the present disclosure.

Referring now to FIG. 4, a first pulse control pattern is provided in accordance with the present disclosure. In the first pulse control pattern, a target torque is delivered by providing a pulse current $I_{pulse}$ to pulse an electric motor at a pulse torque. The target torque is the average of the pulse torque over time or the product of a duty cycle of the pulse torque and a value of the pulse torque. The current delivered to the electric motor has a mean current $I_{pulse}$ which is the average current provided to the electric motor over time and a root mean square current $I_{rms}$.

To calculate the dissipated heat loss of the pulsed power delivery, the first step is to calculate heat dissipated by providing power during continuous current delivery referred to generally as $Q_{baseline}$. Using the Rint Model above, $Q_{baseline}$ can be calculated as follows:

$$\int_0^T I_{mean}^2 dt = I_{mean}^2 T.$$

Then turning to the first pulse control model, the dissipated heat loss Q can be calculated where:

$$T_{pulse} = \frac{1}{n}T \geq I_{pulse} = nI_{mean}$$

such that:

$$Q = \int_0^T I_{rms}^2 dt = \int_0^{\frac{T}{n}} (nI_{mean})^2 dt = nI_{mean}^2 T = nQ_{baseline}.$$

As such, the pulse width or duty cycle of the of the electric motor in pulsed mode is directly proportional to the baseline dissipated heat loss of the battery system in the continuous mode. For example, when the duty cycle is 33% or the pulse width is ⅓ of time T, n is equal to 3. When n is equal to 3, a $I_{mean}$ is ⅓ of $I_{pulse}$. Thus, from the Rint Model, when the pulse control pattern has a duty cycle of 33 percent, the dissipated heat loss of the battery system is three times greater than the dissipation heat loss of a constant power delivery from the battery system baseline. From the Rint Model it is clear that as the duty cycle decreases, the efficiency of the battery system decreases for the first pulse control pattern.

Figure 5:
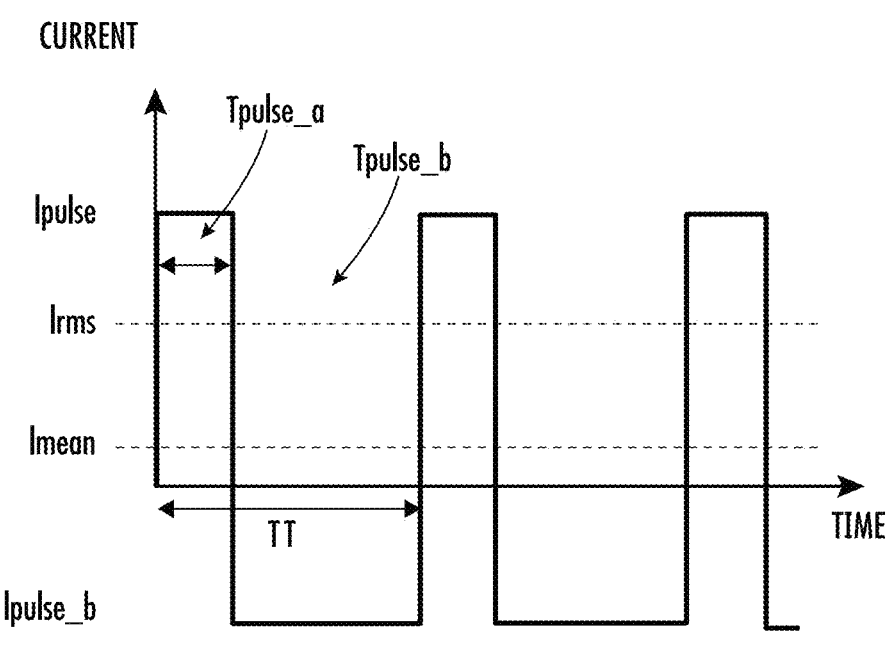
FIG. 5 is an illustration of a second pulse control pattern provided in accordance with the present disclosure.

With reference now to FIG. 5, a second pulse control pattern is provided in accordance with the present disclosure. In the second pulse control pattern, a target torque is delivered by providing a first pulse current $I_{pulseA}$ to pulse an electric motor at a pulse torque and receiving a second pulse current $I_{pulseB}$ from the electric motor. This pattern may be the result of pulsing the electric motor at a high positive torque and regenerating or recapturing energy between the positive torque pulses. This pattern creates a large gap between the $I_{rms}$ and the $I_{mean}$. The heat dissipation loss of the second pattern is greater than n times $Q_{baseline}$. In the examples shown below, the dissipation heat loss from the second pulse control pattern may be 10 times greater than baseline dissipation heat loss of constant current delivery to the electric motor.

Figure 6:
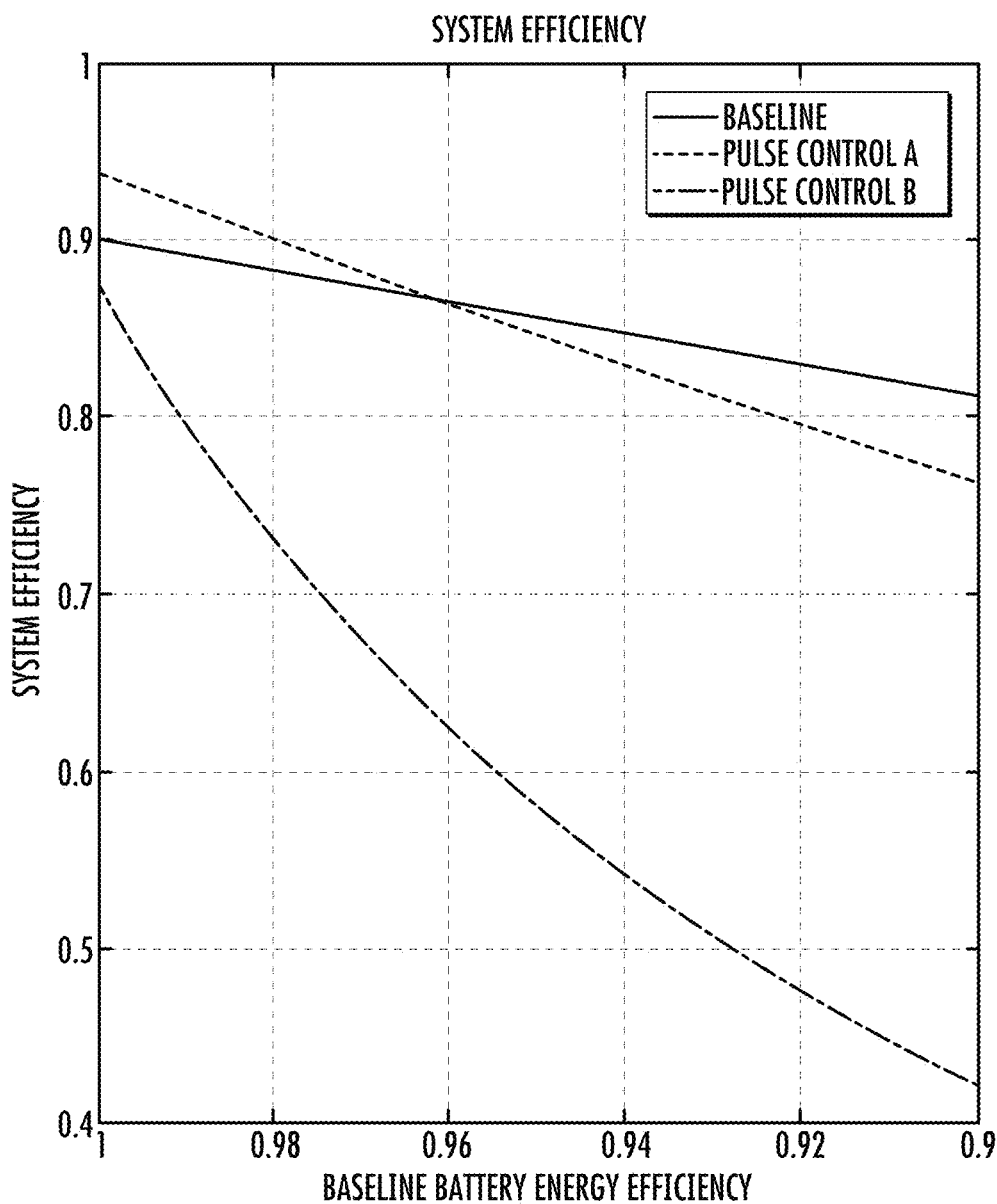
FIG. 6 is a chart of a system efficiency as a function of a battery efficiency provided in accordance with an embodiment of the present disclosure.

FIG. 6 shows System Efficiency as a factor of baseline Battery Efficiency for each of continuous torque delivery or Baseline, the first pulse control pattern, and the second pulse control pattern. Using the Rint model detailed above, there is a crossover point for where pulsing an electric motor may increase an overall system efficiency compared to a baseline of continuous torque delivery. This is shown that on the left side of the crossover point, the gains of motor efficiency from pulsed torque delivery are greater than a decrease in battery efficiency and on the other side of the crossover point, the battery efficiency offsets any potential motor efficiency gains. It is also shown that on the right side of the crossover point, the decrease in battery system efficiency is greater than the gains in motor efficiency from the pulsed mode.

Figure 7:
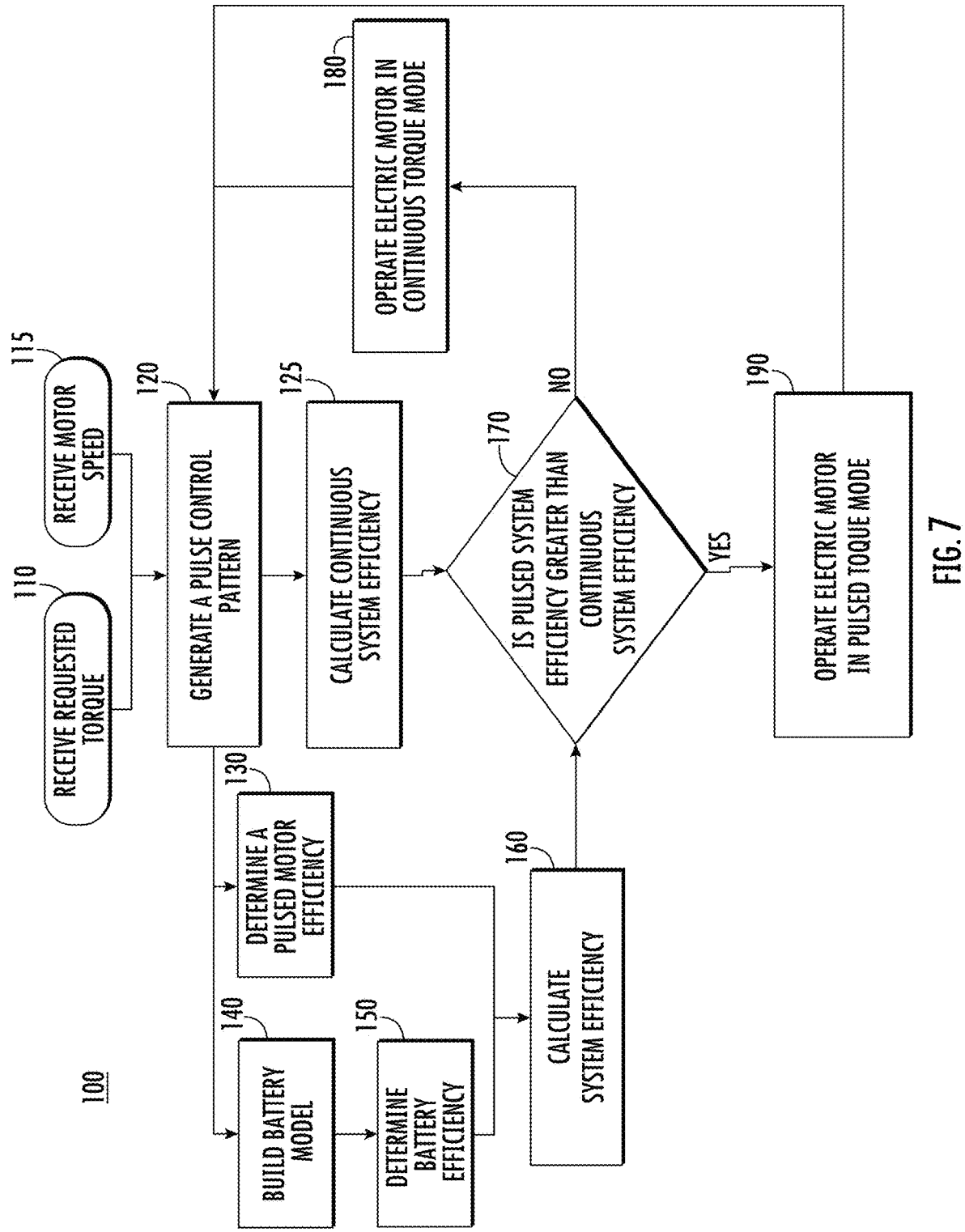
FIG. 7 is a flow chart of a method of optimizing system efficiency for a pulsed electric motor provided in accordance with an embodiment of the present disclosure.

Referring now to FIG. 7, a method of optimizing system efficiency for a pulsed electric motor is disclosed in accordance with the present disclosure and is referred to generally as method 100. The method 100 is executed on a controller that provides signals to an electric motor to deliver a target torque to a drive component.

The method 100 may include a controller of the electric motor receiving an input signal requesting a target torque from the electric motor (Step 110). The controller may also receive a motor speed from one or more sensors associated with the motor (Step 115). The controller generates a pulse control pattern in response to receiving the target torque for the electric motor (Step 120). The generated pulse control pattern may be at least partially based on a motor speed. Additionally or alternatively, the generated pulse control pattern may be at least partially based on operating conditions of the electric motor including, but not limited to a vehicle speed or a motor temperature. The controller may optimize the generated pulse control pattern to maximize motor efficiency of the electric motor and determine a motor efficiency gain as a result of the generated pulse control pattern when compared to continuous torque delivery (Step 130).

Before the generated pulse control pattern is provided to the electric motor, the controller calculates a system efficiency of the generated pulse control pattern (Step 160). To calculate the system efficiency, the controller requires at least the motor efficiency (Step 130) and a battery efficiency (Step 150). As such, the system efficiency is at least partially dependent on the motor efficiency and at least partially dependent on the battery efficiency. The battery efficiency of the pulsed power request is calculated using a battery model (Step 140). The battery model may be any battery model including, but not limited to, an Ideal Voltage Source Model, a SOC Model, a Rint Model, a Thevenin Model, or an ESC Model. The battery model may be based at least partially on operating conditions of the battery or cell including, but not limited to the generated pulse pattern, a cell current, a cell terminal voltage, a cell temperature, a cell internal resistance, or pulsing current. The battery model may include input of real-time operating conditions provided by one or more sensors. With the operating conditions, the battery efficiency is calculated using the battery model (Step 150).

With the battery efficiency and the motor efficiency calculated, the pulsed system efficiency is calculated for the generated pulse pattern (Step 160). The controller compares the pulsed system efficiency to a continuous or baseline system efficiency (Step 170). The continuous system efficiency may be calculated by the controller from a battery efficiency and a motor efficiency of continuous torque delivery of the target torque (Step 125). When the continuous system efficiency is greater than the pulsed system efficiency, the controller operates the electric motor to deliver the target torque via continuous torque delivery (Step 180). When the pulsed system efficiency is greater than or equal to the continuous system efficiency, the controller operates the electric motor to deliver the target torque via the generated pulse pattern (Step 190). The target torque delivery of Step 180 or Step 190 continues until another target torque is requested and received by the controller (Step 110). The method 100 is repeated for the new target torque requested.

Figure 8:
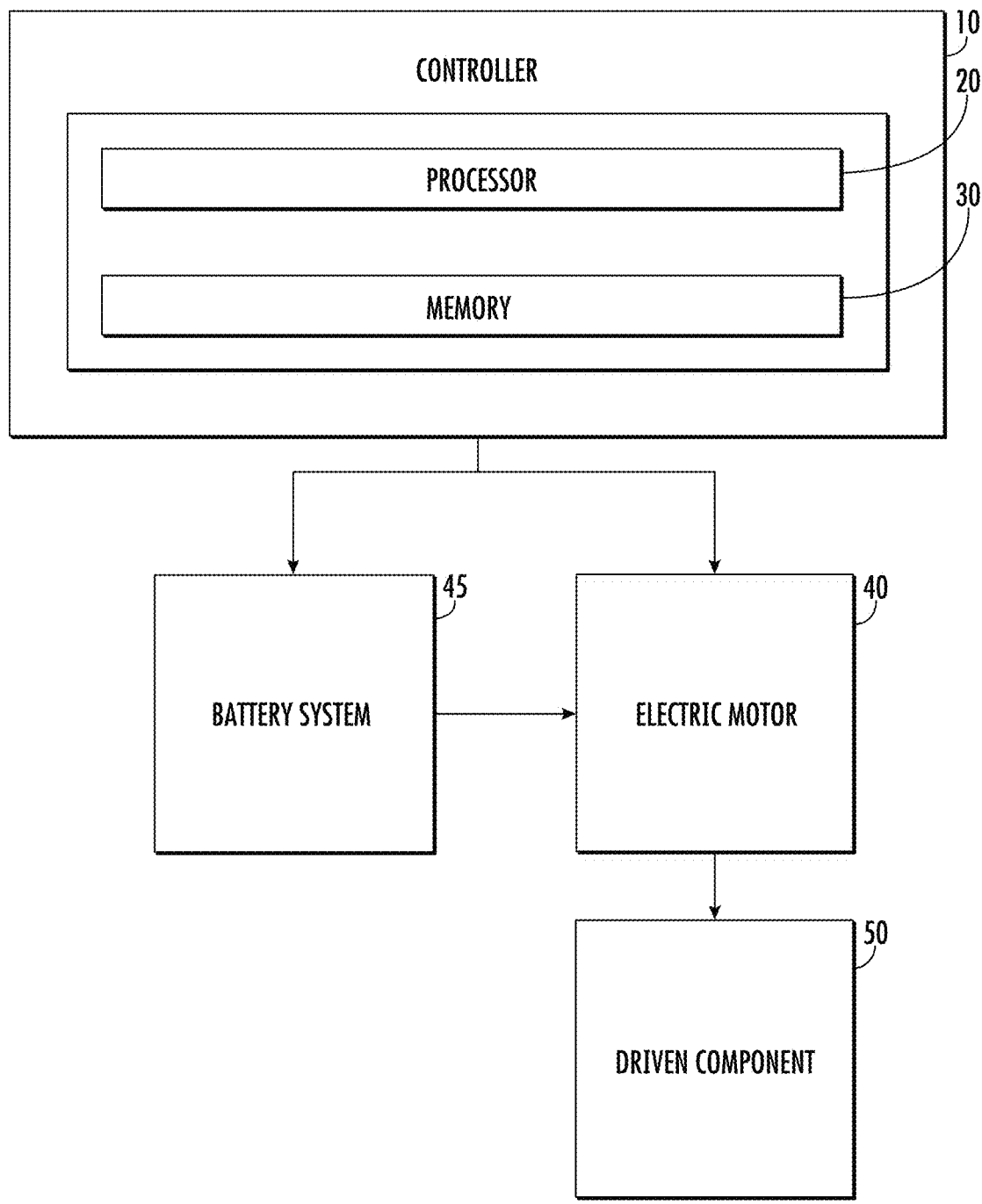
FIG. 8 is a schematic of a system provided in accordance with an embodiment of the present disclosure.

With reference to FIG. 8, an exemplary system is provided in accordance with the present disclosure. The system includes a controller 10, an electric motor 40, a battery system 45, and a driven component 50. The controller 10 includes a processor 20 and memory 30. The memory 30 may include one or more programs that are stored in the memory 30 and executed on the processor 20. The controller 10 may be operably coupled to the electric motor 40 and/or the battery system 45 such that the controller 10 operates the electric motor 40 and/or the battery system 45 based on instructions stored on the memory 30 and executed on the processor 20. The electric motor 40 may be operably coupled to a driven component 50 such that the electric motor 40 operates to rotate the driven component 50. The controller 10 may execute any of the methods detailed herein to operate the electric motor 40 and/or the battery system 45.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A method of controlling an electric motor, the method comprising:
   determining a first system efficiency for an electric motor operating at a first modulation frequency, the first system efficiency at least partially based on operating conditions of a battery system providing power at the first modulation frequency; and
   operating the electric motor at the first modulation frequency.

2. The method of claim 1, further comprising:
   determining a second system efficiency for the electric motor operating at a second modulation frequency, the second system efficiency at least partially based on operating conditions of the battery system providing power at the second modulation frequency, the second modulation frequency being different from the first modulation frequency; and
   operating the electric motor at the first modulation frequency when the first system efficiency is greater than the second system efficiency.

3. The method of claim 2, wherein determining the first system efficiency for the electric motor includes calculating the first system efficiency for delivering a requested torque from the electric motor, wherein determining the second system efficiency for the electric motor includes calculating the second system efficiency for delivering the requested torque from the electric motor.

4. The method of claim 1, wherein determining the first system efficiency includes determining a first battery efficiency at least partially based on a dissipated heat loss of the battery system when providing power at the first modulation frequency.

5. The method of claim 1, wherein determining the first system efficiency at least partially based on the operating conditions of a battery system at the first modulation frequency comprises the operating conditions of the battery system including a battery temperature, a pulsing current, a battery terminal voltage, or a battery internal resistance.

6. The method of claim 1, wherein determining the first system efficiency includes determining a first motor efficiency of the electric motor at least partially based on operating conditions of the electric motor.

7. The method of claim 6, wherein determining the first motor efficiency of the electric motor comprises the operating conditions of the electric motor including a motor speed, a motor torque, a vehicle speed, or a motor temperature.

8. The method of claim 1, further comprising generating a pulse waveform for delivering a requested torque from the electric motor at the first modulation frequency.

9. The method of claim 8, wherein generating the pulse waveform includes pulsing the electric motor at a pulse torque greater than the requested torque to deliver the requested torque.

10. The method of claim 8, wherein generating the pulse waveform includes regenerating energy between pulses of the electric motor.

11. A non-transitory computer-readable storage medium having instructions stored thereon that, when executed by a controller, cause the controller to:
    determine a first system efficiency for an electric motor operating at a first modulation frequency, the first system efficiency at least partially based on operating conditions of a battery system providing power at the first modulation frequency; and
    operate the electric motor at the first modulation frequency.

12. The non-transitory computer-readable storage medium of claim 11, wherein the controller is further caused to:
    determine a second system efficiency for the electric motor operating at a second modulation frequency, the second system efficiency at least partially based on operating conditions of the battery system providing power at the second modulation frequency, the second modulation frequency being different from the first modulation frequency; and operate the electric motor at the first modulation frequency when the first system efficiency is greater than the second system efficiency.

13. The non-transitory computer-readable storage medium of claim 12, wherein the controller determines the first system efficiency for the electric motor by calculating the first system efficiency for delivering a requested torque from the electric motor, wherein determines the second system efficiency for the electric motor by calculating the second system efficiency for delivering the requested torque from the electric motor.

14. The non-transitory computer-readable storage medium of claim 11, wherein the controller determines the first system efficiency at least partially on the operating conditions of a battery system comprises the operating conditions of the battery system including a battery temperature, a pulsing current, battery terminal voltage, or battery internal resistance.

15. The non-transitory computer-readable storage medium of claim 11, wherein the controller calculates the first system efficiency based at least partially on a first motor efficiency.

16. A controller for operating an electric motor to rotate a driven component, the controller comprising:
   a processor; and
   a memory including a program to cause the processor to:
      determine a first system efficiency for an electric motor operating at a first modulation frequency, the first system efficiency at least partially based on operating conditions of a battery system at the first modulation frequency; and
      operate the electric motor at the first modulation frequency.

17. The controller according to claim 16, wherein the program further causes the processor to:
   determine a second system efficiency for the electric motor operating at a second modulation frequency, the second system efficiency at least partially based on operating conditions of the battery system that the second modulation frequency, the second modulation frequency being different from the first modulation frequency; and
   operate the electric motor at the first modulation frequency when the first system efficiency is greater than the second system efficiency.

18. The controller according to claim 16, wherein determining the first system efficiency includes determining a first battery efficiency at least partially based on a dissipated heat loss of the battery system at the first modulation frequency.

19. The controller according to claim 16, wherein determining the first system efficiency at least partially on the operating conditions of a battery system comprises the operating conditions of the battery system including a battery temperature, a current, battery terminal voltage, or battery internal resistance.

20. The controller according to claim 16, wherein calculating the first system efficiency is based at least partially on a first motor efficiency operating at the first modulation frequency.

* * * * *